United States Patent

Schielke et al.

[11] Patent Number: 5,365,053
[45] Date of Patent: Nov. 15, 1994

[54] METHOD AND APPARATUS FOR SETTING THE SHARPNESS OF AN OPTICAL IMAGING SYSTEM

[75] Inventors: Rainer Schielke, Fleckeby; Holger Suhr, Kiel; Udo Wurdemann, Klausdorf; Axel Heuer, Fahren, all of Germany

[73] Assignee: Linotype-Hell AG, Kiel, Germany

[21] Appl. No.: 107,783

[22] Filed: Aug. 31, 1993

[30] Foreign Application Priority Data

Feb. 19, 1991 [DE] Germany .............. 4105002

[51] Int. Cl.⁵ .............................................. G01J 1/20
[52] U.S. Cl. .................................. 250/201.7; 354/402
[58] Field of Search .............. 250/201.7, 201.2, 201.4; 354/400, 402, 403

[56] References Cited

U.S. PATENT DOCUMENTS

| | | | |
|---|---|---|---|
| 4,010,479 | 3/1977 | Nobusawa | 354/25 |
| 4,083,056 | 4/1978 | Nakamura et al. | 354/25 |
| 4,123,778 | 10/1978 | Graf et al. | 358/107 |
| 4,203,031 | 5/1980 | Kamachi et al. | 250/201 |
| 4,255,028 | 3/1981 | Aoki | 354/25 |
| 4,350,884 | 9/1982 | Vollath | 250/204 |
| 4,563,705 | 1/1986 | Oinoue et al. | 358/227 |
| 4,600,832 | 7/1986 | Grund | 250/201 |
| 4,660,094 | 4/1987 | Yoshimoto et al. | 358/285 |
| 4,806,746 | 2/1989 | Will et al. | 250/201 |
| 4,883,951 | 11/1989 | Yokoyama et al. | 250/201 |
| 4,902,101 | 2/1990 | Fajihara et al. | 350/320 |
| 4,937,620 | 6/1990 | Ozawa et al. | 355/77 |
| 5,003,165 | 3/1991 | Sarfati et al. | 250/201.2 |
| 5,083,150 | 1/1992 | Nagasaki et al. | 354/402 |

FOREIGN PATENT DOCUMENTS

| | | | |
|---|---|---|---|
| 0238699A1 | 9/1987 | European Pat. Off. | G02B 7/11 |
| 2234448B2 | 3/1976 | Germany | G02B 21/26 |
| 2652287B2 | 6/1978 | Germany | G02B 7/11 |
| 3406629A1 | 9/1984 | Germany | G02B 7/11 |
| 3340647A1 | 5/1985 | Germany | G02B 7/11 |
| 3340847A1 | 5/1985 | Germany | G02B 7/11 |
| 3439304A1 | 5/1985 | Germany | G02B 7/11 |
| 3634609A1 | 1/1988 | Germany | G03B 27/34 |
| 1545437 | 5/1979 | United Kingdom | G05D 3/04 |

*Primary Examiner*—David C. Nelms
*Assistant Examiner*—Steven L. Nichols
*Attorney, Agent, or Firm*—Hill, Steadman & Simpson

[57] ABSTRACT

A method and an apparatus for setting the sharpness of an optical imaging system by step-by-step adjustment of the distance between a subject and an objective and by evaluating the sharpness values identified for the individual distances. First, the sharpness values (S) for two distances (R) modified proceeding from a prescribed distance (Ro) by a respective step width in both adjustment directions are identified and the best sharpness value is determined by comparing these sharpness values (S) to the sharpness value (So) for the prescribed distance (Ro). Respectively two distance points (R1 through R4) having defined step widths proceeding from the prescribed distance (Ro) are then identified in an allowed range of adjustment (VS) and the appertaining sharpness values (S1 through S4) are identified. After this, straight lines (G1; G2) are placed through respectively two of the sharpness values (S1 through S4) to the left and right of the sharpness value (So), these being the tangents at the function curve (V) of the sharpness values (S) dependent on the distances (R). The intersection of the straight lines (G1; G2) and the distance value (Rmax) belonging to the intersection are then identified, this yielding the maximum sharpness value (Smax).

19 Claims, 3 Drawing Sheets

METHOD AND APPARATUS FOR SETTING THE SHARPNESS OF AN OPTICAL IMAGING SYSTEM

BACKGROUND OF THE INVENTION

The invention is directed to a method and to an apparatus for setting the sharpness of an optical imaging system by step-by-step adjustment of the distance between a subject and an objective until a maximum is achieved for the respectively calculated sharpness values of the objective.

Methods and apparatus for setting the sharpness of an optical imaging system .can be used everywhere that imaging systems must be focused with extreme precision to nearly two-dimensional surfaces, for example image originals. Over and above this, methods and apparatus can be particularly advantageously utilized when it is a matter of optimally setting a pre-set focusing condition in a focus re-correction.

Methods and apparatus for setting the sharpness of an optical imaging system and for calculating the focusing condition are already known in the greatest variety of applications and embodiments. Solutions have thus already been recited for the various problem areas (which derive from the type of subject that can be two-dimensional or three-dimensional and low in contrast or high in contrast), from the desired depth of field range, and from the chronological demands and the implementation of the method. German Patent 31 41 182 thus discloses an apparatus for defining the focusing condition of an optical imaging system that enables the identification of the focusing condition of the imaging system such that a stabilized identification of the focusing condition that is largely independent of brief-duration lens-to-image variations is assured. For this purpose a memory and evaluation circuit is proposed that, however, undertakes numerous steps and is directed to the specific problem.

It has already been proposed for the field of self-focusing microscopes to form the brightness difference of every picture element of a usually three-dimensional original with respect to its two neighboring points with the assistance of a sensor and to add up these brightness differences for all picture elements, to then subsequently adjust the distance between subject and objective and to again form the said sum in order to then select that distance at which the allocated sum is a maximum (German Published Application 33 40 647).

SUMMARY OF THE INVENTION

It is an object of the invention to provide a given focus value which can be quickly and reliably corrected, particularly given knowledge of a region of focus to be anticipated, and wherein a subject-to-lens distance can be automatically set with an optimum sharpness.

In an apparatus of the type initially cited, another goal is to facilitate the operation and, thus, the practical application and, for this purpose, to undertake an automatic sharpness setting with high precision and great reliability, so that a fast adaptation to a modified original and, potentially, modified diameter of an image carrier drum is possible. In particular, it should become possible to calculate the focus at a work preparation means and to transfer it onto a scanner without these two apparatus having to exhibit a high absolute precision.

According to the invention, sharpness of an optical imaging system is set by step-by-step adjustment of a distance between a subject and an objective until a maximum is achieved for a respectively identified sharpness value of the subject. Sharpness values are formed from a sum of squared differences of image signal values of the subject in a line of neighboring pixels. An initial one of the sharpness values is identified at a prescribed distance between the subject and the objective. The prescribed distance is varied by a first step width in both adjustment directions and corresponding sharpness values are calculated. A starting distance corresponding to a best of the previous sharpness values is identified as a starting value. First and second distances are defined in each adjustment direction, one of the distances having a relatively large second step width and the other distance having a relatively small step width from the starting distance corresponding to the best sharpness value. A check is conducted to determine whether the first and second distances in each adjustment direction lie within a prescribed possible range of adjustment between the objective and subject, and, if not, the second and third step width are made smaller. Corresponding first and second sharpness values for the first and second distances are identified in each adjustment direction. A straight line is defined that contains or intersects the first and second sharpness values lying at each side of the best sharpness value, the straight lines being tangents at a curve defining the sharpness values over distances within the range of adjustment. An intersection of the two tangents is identified. A distance corresponding to the intersection is identified as an adjustment value between the objective and the subject. The distance between the subject and the objective is then adjusted to the adjustment value.

Even slight differences, such as occur given an exact setting, can be reliably processed and stored on the basis of a digital processing, whereby an optimum evaluation is possible on the basis of the squaring. Great differences are weighted more highly than small differences in the sum formation in this way. Which of the focusing conditions belonging to the sharpness values and in what direction a further improvement can be anticipated derive from the sharpness values. When the maximum of the sharpness setting is exceeded, the sharpness value becomes lower and the evaluation and setting of the invention follow. Steps that are initially larger and later smaller can also be selected for the approximation to the desired optimum of the focusing condition until the difference sharpness value falls below a defined limit value. It is thereby indicated that the focusing condition has reached the optimum value at least in an extremely close approximation. A small section of a scan line that, for example, is approximately 512 picture elements long, is expediently employed for the section that is scanned for calculating the sharpness value. A special selection of the image region is only required in specific instances, since the method and the apparatus are designed such that a section in the middle of the image can generally be selected. Image regions having fine modulation (for example, fabric patterns) have thereby especially proven themselves. Black areas on film originals are also well-suited since there is the possibility therein to set the sharpness to the film grain.

The section of the scan line can be approximately 15 mm long given an opaque image original or it can be approximately 10 mm long given a transparency image original. Of course, departures from these particulars are possible without further ado within the framework of the invention. Whereas a plurality of clearly distinguished image details should optimally be present within the region scanned for calculating the sharpness value given a manual setting of the sharpness value, this is not necessary in the procedure of the invention since a correspondingly designed apparatus undertakes the evaluation of the image original as a subject a differently and independently of the criteria of the-human eye.

Practice has shown that the brightness signals of the red channel are particularly suited for acquiring the sharpness value since the cyan separation derived therefrom has the greatest influence on the sharpness impression upon utilization of the scanned image original for an image reproduction in superimposed printing. The magenta separation is also important, whereas the yellow separation is of subordinate significance for the acquisition of the sharpness value.

The scanning is preferably undertaken given a small scanner diaphragm of the imaging system, so that small details can be resolved and their brightness changes take effect. The scanning should thereby be undertaken given a prescribed, slight depth of field of the imaging system, i.e. given a fully open diaphragm of the objective, so that small changes of the focusing condition, particularly small changes of the distance between image original and optical system, have an optimally great influence on the sharpness value.

The focusing condition can be changed with at least one motor, for example a stepping motor. The stepping motor thereby has an extremely small step width, so that focusing can occur with practically infinite variation. A defined allocation between the focusing condition and the sharpness value obtained is also possible as a result thereof. Over and above this, an adjustment with a piezo drive can also be possible, this operating in a completely infinitely variable way and being capable of taking effect quickly and softly.

The focusing condition is expediently readjusted by steps from 0.5 through 0.25 mm, and preferably 0.3 mm. Particularly when the optimum is being approached, readjustment steps can be made smaller down to 2 μm (0.002 mm).

Before the first identification of the sharpness value, the focusing condition of the imaging system can be expediently set to a specific initial value that, for example, lies in the proximity of the value to be anticipated for the sharpness setting. Such a setting to an initial value can also be manually undertaken, for example while observing the scanned image, so that, for saving time, a longer adjustment in an unsharp condition is not required.

The setting to at least approximately maximum sharpness can also be undertaken at various locations of the image original and the coordinate values of each of these locations as well as the corresponding focusing conditions can then be stored such that the focusing condition can be automatically readjusted when scanning an image original. This can have significance when the position of the surface of the image original changes in the region to be scanned, for instance due to the fact that the carrier drum is eccentric or the axis of the surface to be scanned is not exactly straight but sags somewhat. This can be taken into consideration by the automatic readjustment of the focusing condition.

An exemplary embodiment of the invention shall be set forth in greater detail below with reference to the drawings.

DESCRIPTION OF THE PREFERRED EMBODIMENTS

Figure 1:
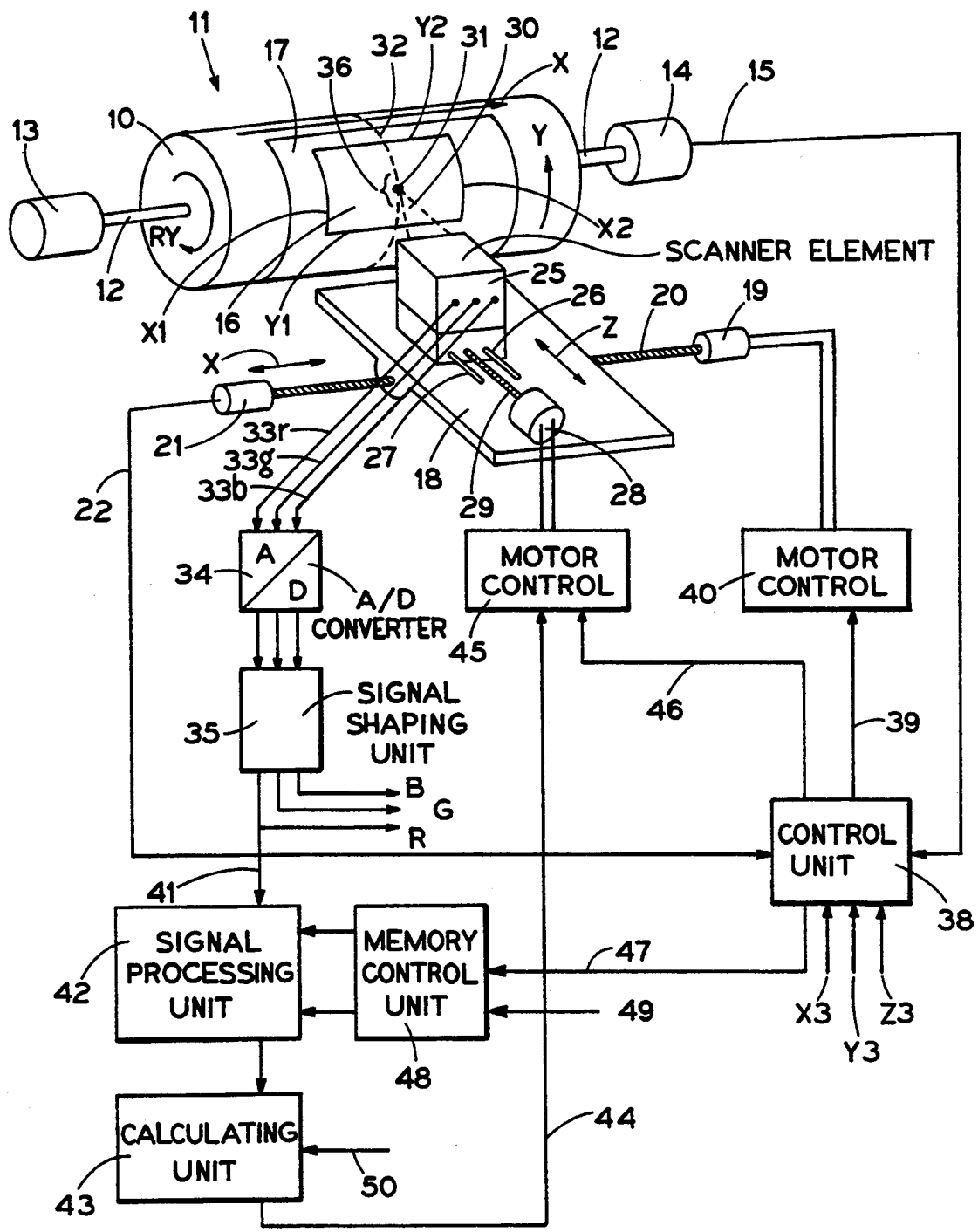
FIG. 1 shows the interacting parts and signal modification stages, partly schematically or in switch stages.

A scan drum 10 of an apparatus 11 for identifying the focusing condition is rotatable around a shaft 12, whose bearing is not shown, and is driven by a motor 13 in a RY rotational sense according to the arrow shown at the left-hand face side. A coordinate generator 14 attached to the other end of the shaft 12 supplies a coordinate signal at the line 15 that corresponds to the scanning in the scan window 16 on the original 17 in a Y-direction that proceeds from bottom to top at the front side of the scan drum 10. The electronic scan window thereby defines the region of the original that is to be reproduced.

A feed carriage 18 for the scanning in a X-direction that proceeds from left to right parallel to the shaft 12 is arranged in front of the scan drum 10, being schematically shown, i.e. particularly without further mechanical bearings, and being moved by a motor 19 with a spindle 20 along the scan drum 10 parallel to the shaft 12. A coordinate generator 2i supplies corresponding X-coordinate signals at a line 22.

An opto-electronic scanner element 25 that is guided on slide rods 26 and 27 and that can be displaced in a Z-direction with a spindle 29 driven by a motor 28 is arranged on the feed carriage 18.

In the focused condition, the beam cone 30 belonging to the scanner element 25 should acquire the brightness of a picture element 31 of the original 17 within the scan window 16, this lying on a scan line 32. The measured value color signals for red, green and blue that are thereby obtained are supplied via lines 33r, 33g, 33b to an analog-to-digital converter 34 that, via the signal-shaping unit 35, supplies digital color data R, G and B for the further signal processing.

The measured value color signals R, G and B on the lines 33r, 33g and 33b are digitized into 12 bit color data via the analog-to-digital converter 34 and are edited in the signal-shaping unit 35, for example are logorithimized and subjected to a white balancing. The measured value color signals R, G and B supplied at the output are further-processed, for example subjected to a color correction, and can then be supplied to a recorder (not shown) or to some other recording device.

The scan window 16 on the original 17 defines the coordinates for the region to be scanned, whereby the left-hand edge and the right-hand edge in the axial direction are referenced X1 and, respectively, X2, and the lower edge and the upper edge in the circumferential direction, opposite the rotational sense RY, are respectively referenced Y1 and Y2.

For the desired focus setting for maximum image sharpness, a small scanner diaphragm is brought into the beam path in the scanner element 25, this, for example, effecting a scan point 31 having a diameter of 0.02 mm. This scanner diaphragm can also be employed for the white balancing that is required from time to time in order to set the measured value color signals R, G and B for the further processing.

The scanner diaphragm for the scanning, particularly for the production of a color separation (job diaphragm) derives from the scale calculation and is usually larger than the scan diaphragm for the focus correction. The above-addressed white balancing occurs with the job diaphragm.

For setting the focusing condition, a section of the image original must be scanned with the scan point 31, this section corresponding in FIG. 1 to the middle part 36 of the image line 32, whereby the middle of this section 36 can have the coordinate values X3 and Y3 allocated to it at the point 31. These coordinate values can be input via a central control unit 38 to whose inputs the line 22, on the one hand, with the value of the respective X-coordinate and the line 15 with the value of the respective Y-coordinate are connected and this central control unit 38 controlling the motor controller 40 of the X-direction by the motor 19 to the desired value X3 via an output line 39.

A signal processing unit 42, by whose output the motor controller 45 is actuated for the focus adjustment motor 28 via a calculating unit 43 and a line 44, is driven at the output for the color data R of the signal-shaping unit 35 via a line 41.

From the input Z3, the focusing is set to an initial value via the control unit 38, a line 46, the motor controller 45 and the motor 28. This value can be prescribed in some way or other by a memory; it is also possible to undertake a manual setting via a manually actuated controller, whereby the sharpness is visually judged at the same time in an image reproduction means that is not shown.

Via a connection 47, the signals of the Y-coordinate generator 14 and of the prescribed coordinate value Y3 of the point 31 are supplied by the central control unit 38 to a memory control unit 48, as is also a region signal 49 that identifies the section 36 for the calculation of the sharpness value.

The signal processing unit 42 is then controlled by the memory control unit 48 such that only a part of the color data R corresponding to the section 36 is allowed to pass through to a calculating unit 43. For that purpose, the memory control unit 48 defines the required write clock and a write instruction.

The utilized color data R cover 512 picture elements of the image line 32 corresponding to an image line length of 10 mm in the region of the coordinate value Y3. They are written into the image line memory of the signal processing unit 42. When the height of the scan window 16 is smaller, the number of picture elements for the section 36 is also selected lower.

The image line memory in the signal processing unit 42 has, for example, a capacity of 512×9 bits. Since the color data have 12 bits, only the more significant bits are thus transferred into the image line memory. The image line memory in the signal processing unit 42 is preferably a FIFO memory (first in/first out), whereby the data are successively input and the data that are input first likewise also appear first at the output. The color data R are then supplied to the calculating unit 43 wherein the difference between the color data R of a picture element from the color data of the preceding picture element is formed and squared and the squares acquired in this way are added up, whereby the sum of these squares is formed over a section 36 and represents the sharpness value.

Via the spindle 29, the focus is now adjusted with the motor 28 in an arbitrary direction by a defined value dZ. The size of dZ can be defined with a variation signal supplied to the calculating unit 43 via the line 50, this variation signal being supplied via the line 44 to the motor controller 45. A new sharpness value is then formed and a positive or negative variation signal dZ is supplied to the motor controller 45 dependent on whether this new sharpness value is higher or lower than the earlier sharpness value, and is supplied to the motor controller 45 such that an adjustment in the direction toward a greater sharpness occurs. When the maximum value of the sharpness is exceeded, the adjustment value dZ can be reduced, i.e. from 0.3 mm at the outset to 0.15 mm. Potentially, the focus setting can be repeated in various directions until the maximum sharpness has been at least approximately set.

The curve of the sharpness value dependent on the focus setting Z forms a cone whose apex corresponds to the maximum sharpness. Given three measured points, this curve can be approximated by a circle and, given more measured points, can be approximated by a parabola of the second or of a higher degree with a vertical axis. When, in addition to a highest measured value, at least one measured value lying therebefore and lying thereafter is found, the apex of an approximation curve can be identified by an arithmetic program and the focus setting can be undertaken thereupon. However, only an approximated setting is possible given employment of a stepping motor. The method of the invention for calculating an approximate curve and for defining the point or, respectively, distance with maximum sharpness shall be set forth in yet greater detail below.

One cannot only employ a section 36 of an image line in the middle of the scan window 16 for the calculation of the optimum sharpness setting, but a corresponding sharpness setting is also possible in every other region. Particularly when the surface of the scan window 16 does not lie exactly on the cylinder surface with respect to the shaft 12 or when the scan drum 10 is seated somewhat eccentrically on the shaft or when the scan drum 10 does not exactly correspond to the cylinder surface but sags somewhat in the middle, it can be expedient to undertake a sharpness calculation at at least one other location of the scan window 16. It must thereby be taken into consideration that the scanner drum 10 can initially sag somewhat at the opposite end, particularly given a one-sided chucking. This, however is eliminated by self-centering after a short run-in time. The identified setting value Z for the focusing means can then be stored in one of the units 42, 43 or 48 such that the focusing is somewhat re-adjusted during a scanning of an original. It can be potentially expedient to supplement the motor 28 with a piezo drive with which infinite variations, potentially with a higher speed, are also possible during a drum revolution.

Figure 2:
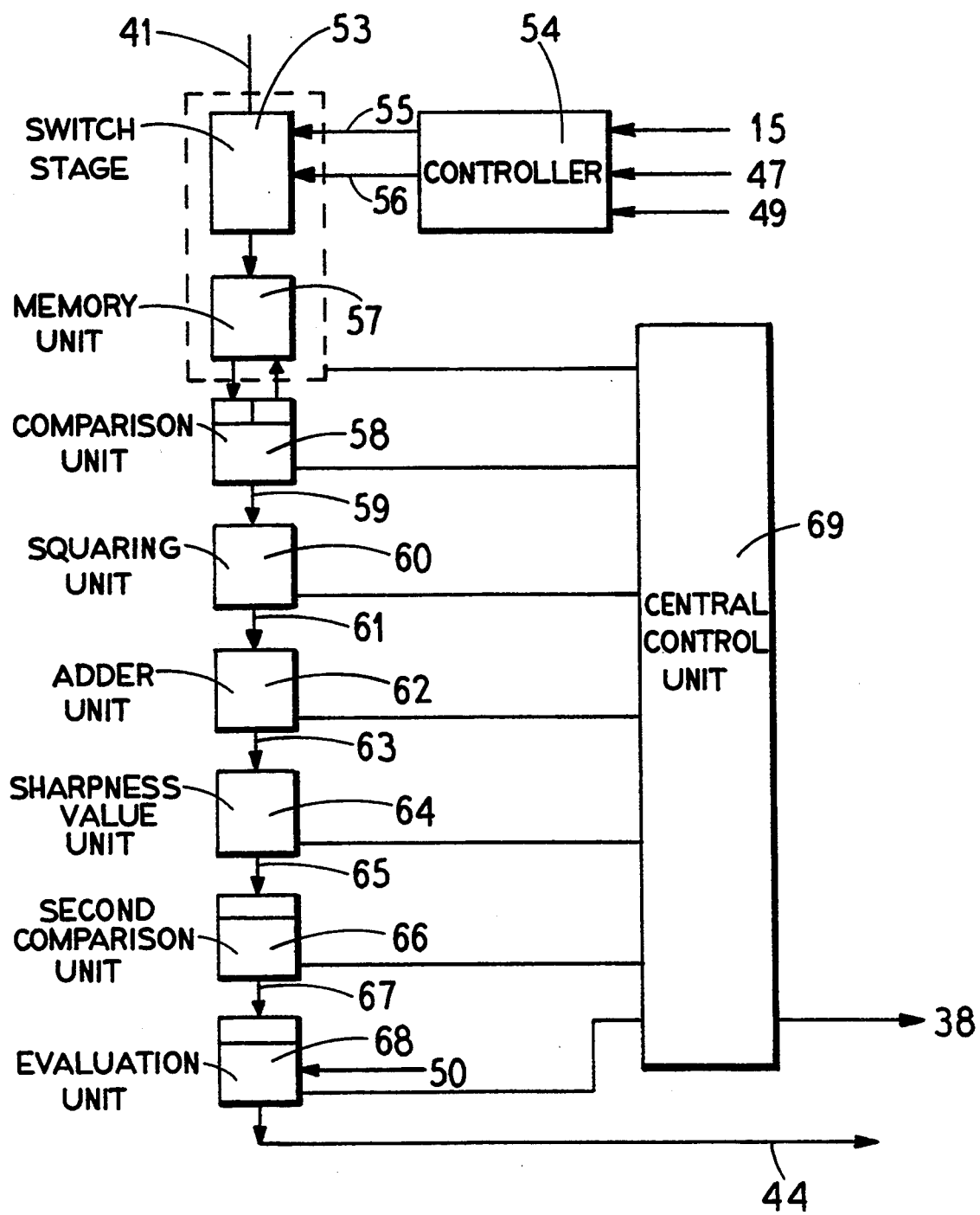
FIG. 2 illustrates the processing for producing and evaluating the sharpness signals with a number of details.

FIG. 2 shows switch stages that are essentially active in the signal processing unit 42, the calculating unit 43 and the memory control unit 48 of FIG. 1.

The color data R of the red channel are supplied by a line 41 to a switch stage 53. The interval stage 54 is driven by the Y-coordinate signal from the line 15, by the Y3-coordinate value of the point 31 via the line 47 and by the Y-region signal 49. Control values, which allow the color data R of the scan line 32 to pass from the start of the section 36 up to its end through to the memory stage 57 and stores them there, are supplied to the switch stage 53 via the lines 55 and 56. The stored color data R are called in pixel by pixel by the comparison unit 58 and the difference signal between the color data of successive pixels is formed and is squared in the following squaring unit 60 connected via a line 59.

The squares obtained in this way are supplied from the output to the squaring unit 60 via a line 61 to an adder unit 62 in which the squares of the difference signals from the line 61 are summed up over the given plurality of pixels that is established by the interval unit 54.

The sum obtained in this way yields the sharpness signal of the corresponding, scanned section and is supplied at the end of the summation interval to a sharpness value unit 64 and is retained there. When this feed has been carried out, a preparation signal is forwarded to the switch stage 53 via a controller 54, as a result whereof this again accepts the corresponding color data region belonging to the section 36 given the next color data R supplied by the scanner element 25 and forwards them to the memory unit 57. The sharpness value from the stage 64 is supplied to a second comparison unit 66 wherein the sharpness values of successive scans are compared. The positive or negative difference values obtained in this way are supplied via a line 67 to an evaluation unit 68. Dependent on whether this differences value is positive or negative, a corresponding positive or negative adjustment value dZ is supplied via the line 44 to the motor controller 45. A defined value that effects an adjustment in larger steps is initially provided for dZ. When, given an approach to the maximum of the sharpness value, the sharpness value differences become smaller, a switch can be undertaken in the evaluation unit 68 to such effect that an adjustment with smaller values dZ only then occurs, whereby the modified value can be previously input from the outside with a variation signal 50. All units are controlled by a central control unit 69.

Within the framework of the invention, the individual functions, particularly storing and comparison, can also be combined in function units in a way other than that set forth above and that shown in the exemplary embodiment.

In order to undertake the focus setting or, respectively, focus correction in that the distance between the scan original and the objective is set such that a maximum sharpness is achieved, a specific setting or, respectively, correction method is inventively provided in order to reach the optimum setting as quickly as possible. The method can thereby be universally employed. In the present instance, however, it is assumed that a setting value for the optics has already been calculated in the preparation for the scan event, having been calculated in a separate device within the framework of the work preparation for a scan drum on which at least one scan original has been arranged. This pre-set value for the optics as a focus value is identified together with an entire data set that also contains the other setting quantities for a scanner device. This has the advantage that the set-up time of the scanner device is minimized, so that the optimum sharpness setting is achieved with few steps when undertaking the setting or, respectively, correction procedure set forth below.

It is thereby provided in detail that a sharpness value is calculated proceeding from the start value for the distance between objective and subject identified in the work preparation. The distance between the object and the subject is then respectively adjusted by a step having a first, large step width in respectively both adjustment directions and the corresponding sharpness values are respectively calculated for both distance values lying to the right and left of the prescribed distance value on an imaginary sharpness curve. Next, the sharpness value that is hitherto best with the first step width is then calculated with reference to the difference between the sharpness values of the start value and of the steps.

The best sharpness value identified in this way already lies in the region of the maximum sharpness value. This is due to the fact that, due to the scanning of a two-dimensional original, i.e. an original that has essentially no thickness differences, the arrangement of the sharpness values across the range of adjustment distribute along an approximation curve in view of the subject-to-lens distance which approximately corresponds to a downwardly open parabola or hyperbola. This is thereby a matter of the distribution of the sharpness values over the range of adjustment of the subject-by-lens distance. The maximum then merely has to be identified with optimally few steps, whereby the calculation of the best value was always capable of being achieved with few steps, this having been already approximately prescribed by the pre-setting of the regions that was undertaken, since deviations derive anyway only to a slight degree and on the basis of the above-explained influences.

Figure 3:
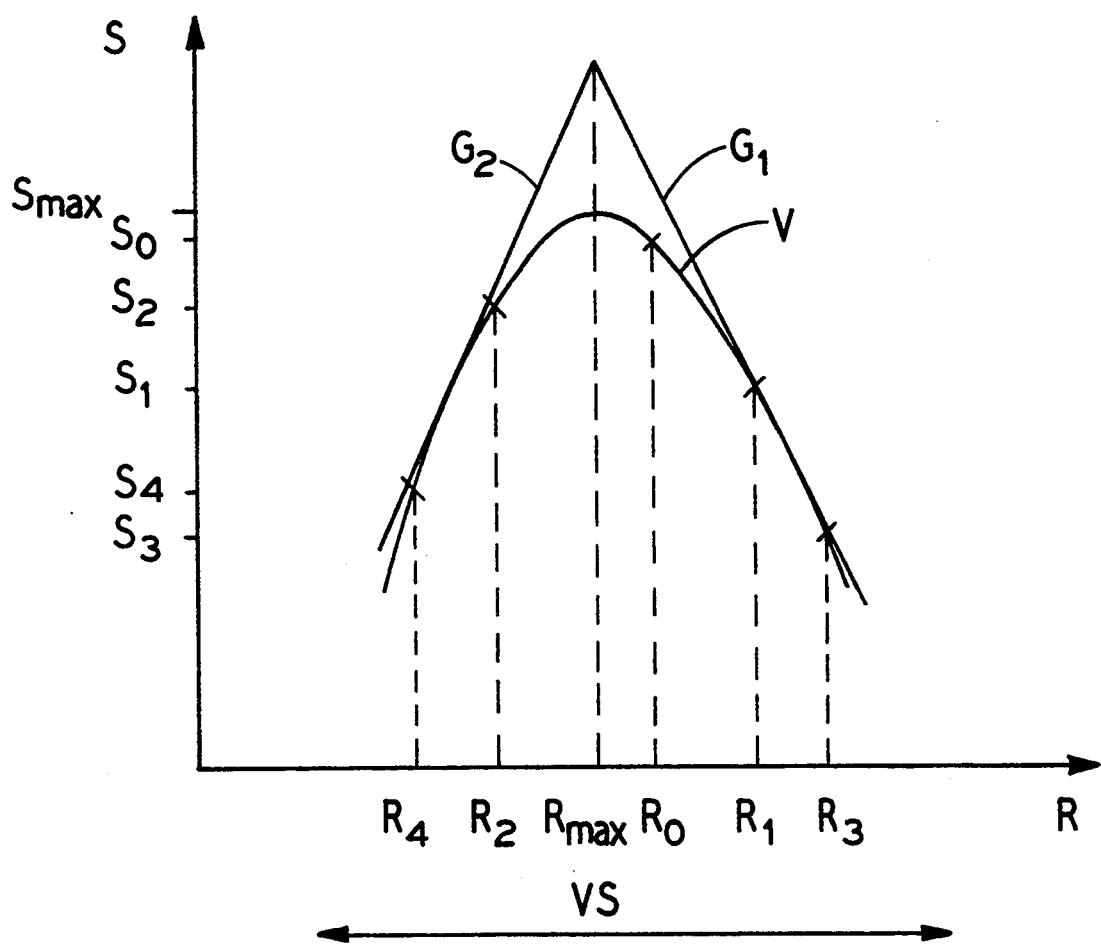
FIG. 3 is a graphic illustration.

It has turned out that the curve V of the sharpness values S over the adjustment values R of the distance between the objective and the subject that derives has a symmetrical course and that the apex point thereof corresponds approximately perpendicularly under the intersection of the tangents G1 and G2 applied to the slopes of the curve V. Four distance points R1, R2, R3, R4 are therefore defined proceeding from the distance point Ro or, respectively, the focus adjustment value of the previously best sharpness value, namely two in every adjustment direction, whereby a step having a large step width of approximately 0.6 mm and a step having a small step width of approximately 0.15 mm from the distance point Ro of the best value So is selected in each adjustment direction. As a protective criterion, a check is carried out to see whether all points lie in a prescribed, possible range of adjustment, in order to preclude that the objective is adjusted into the original and causes damage. When all points do not lie in the prescribed range of adjustment, the step widths are correspondingly reduced in size and another check is carried out to see whether all points then lie in the prescribed range of adjustment VS. When this is the case, the sharpness values S1, S2, S3, S4 are calculated at the four, prescribed distance points R1-R4. Of these sharpness values identified, respectively two correspond to two points of the imaginary tangents and each respectively define a straight line G1, G2. These two straight lines G1, G2 which, of course, are to be viewed as being tangents at the curve of the sharpness values over the range of adjustment, intersect and the adjustment value of the subject-to-lens distance belonging to the intersection corresponds to the adjustment value in which the maximum sharpness value also lies in all probability. These relationships are shown in a purely qualitative way in FIG. 3, whereby the subject-to-lens distance has been set as the distance radius R of the objective from the rotational axis of the scan drum on which the subject is secured.

The adjustment value having the highest sharpness value can be calculated and set in this way and a check can be carried out to see whether everything was successful, namely when Smax>So, S1, S2, S3, S4 applies. Overall, the execution can be characterized as the application of the following steps:

a) identification of a first sharpness value at a prescribed distance between the subject and the objective;

b) variation of the distance by a respective step having a first (large) step width in both adjustment directions and identification of the sharpness values;

c) identification of the distance (focus setting value) having the hitherto best sharpness value;

d) definition of four distance points, namely respectively two in each adjustment direction, namely one with a large step width and one with a small step width at a distance from the distance point of the best value;

e) checking to see whether all points lie in a prescribed, possible range of adjustment and, if not, making the step width in point d) smaller;

f) identification of the sharpness values at the four distance points defined in point d);

g) definition of a straight line that contains or, respectively, intersects the sharpness values respectively lying at each side of the best value on the basis of graphic and computational steps, these straight lines to be respectively viewed as being tangents at the curve of the sharpness values over the range of adjustment;

h) identification of the intersection of the two tangents;

i) identification of the adjustment value of the subject-to-lens distance belonging to the intersection; and j) setting this value.

The objective can be set to optimum sharpness with few steps in this procedure. The invention thereby utilizes the finding that was already recited above and was surprisingly found that, by contrast to the problems in the sharpness setting of, for example, cameras or microscopes or other optical equipment, the sharpness values distribute along a previously identifiable approximation region, so that the additional steps and test measures often to be provided in the other methods can be essentially foregone here.

It can preferably also be provided that a test criterion is built in and that this, for example, can be comprised therein that a check is made to see whether the most recently identified sharpness value which, of course, represents the maximum sharpness value is higher than all other previously identified sharpness values. It can then be assured that the optimum sharpness value has been set.

Although various minor changes and modifications might be proposed by those skilled in the art, it will be understood that we wish to include within the scope of the patent warranted hereon all such changes and modifications as reasonably come within our contribution to the art.

We claim:

1. A method for setting sharpness of an optical imaging system by step-by-step adjustment of a distance between a subject and an objective until a maximum is achieved for a respectively identified sharpness value of the subject, comprising the steps of:

forming sharpness values from a sum of squared differences of image signal values of the subject in a line of neighboring pixels, and identifying an initial one of said sharpness values at a prescribed distance between the subject and the objective;

varying the prescribed distance by a first step width in both adjustment directions and calculating corresponding sharpness values;

identifying a starting distance corresponding to a best of the previous sharpness values as a starting value;

defining first and second distances in each adjustment direction, one of the distances having a relatively large second step width and the other distance having a relatively small third step width from said starting distance corresponding to the best sharpness value;

checking to see whether the first and second distances in each adjustment direction lie within a prescribed possible range of adjustment between the objective and subject and, if not, making said second and third step widths smaller;

identifying corresponding first and second sharpness values for the first and second distances in each adjustment direction;

defining a straight line that contains or intersects the first and second sharpness values lying at each side of the best sharpness value, the straight lines being tangents at a curve defining the sharpness values over distances within said range of adjustment;

identifying an intersection of the two tangents;

identifying a distance corresponding to said intersection as an adjustment value between the objective and the subject; and adjusting the distance between the subject and the objective to said adjustment value.

2. A method according to claim 1 wherein after identifying the first and second sharpness values at the two distance points in each adjustment direction first checking whether the four sharpness values are lower than the best sharpness value and, given non-satisfaction thereof, restarting the method with an enlarged first step width and, otherwise continuing the method.

3. A method according to claim 1 wherein after implementation of identification of said distance associated with said intersection, first identifying a corresponding sharpness value and checking whether the sharpness values and said best sharpness value are lower than said corresponding sharpness value and, given nonsatisfaction thereof, aborting the method and triggering an abort indication, and otherwise continuing the method.

4. A method according to claim 1 including the steps of providing said subject as an image original, and acquiring the image signal values for the sharpness values by point-by-point and line-by-line opto-electrical scanning of the image original.

5. A method according to claim 4 including the steps of identifying the sharpness values by utilizing only image signal values of a section of a scanned line of the image original.

6. A method according to claim 5 including the step of providing said section as approximately 512 pixels long.

7. A method according to claim 5 including the step of providing said subject as an opaque image original and providing said section as approximately 15 mm long.

8. A method according to claim 5 including the steps of providing said subject as a transparency image original and providing said section as approximately 10 mm long.

9. A method according to claim 1 including the steps of providing said subject as an image original and when scanning the color original, employing a color signal of a red channel for identification of the sharpness values.

10. A method according to claim 1 including the steps of providing said subject as an image original and utilizing only more-significant bits of digitized image signal values for identification of the sharpness values.

11. A method according to claim 1 including the steps of providing said subject as an image original and undertaking a scanning thereof with a small diaphragm of an imaging system.

12. A method according to claim 1 including the steps of providing said subject as an image original and scanning the image original with a minimum depth of field of an imaging system.

13. A method according to claim 1 including the steps of providing said subject as an image original and varying a focusing condition of an imaging system therefor with at least one stepping motor.

14. A method according to claim 1 including the steps of providing said subject as an image original and varying a focusing condition of an imaging system therefor with a piezo drive.

15. A method according to claim 1 including the steps of providing said subject as an image original and presetting a focusing condition of an imaging system therefor to an initial value before identification of said initial sharpness value.

16. A method according to claim 15 including the step of identifying said initial value in a work preparation device.

17. A method according to claim 1 including the steps of:
providing said subject as an image original;
undertaking a setting to at least approximately maximum sharpness at various locations of the image original before actual scanning of the image original;
storing coordinate values of every location and corresponding focusing conditions; and
respectively automatically setting a focusing condition in an actual scanning of the image original as soon as an original region around a corresponding location of the image original is scanned.

18. A method for setting sharpness of an optical imaging system by step-by-step adjustment of a distance between a subject and an objective until a value is achieved indicating best sharpness for a respectively identified sharpness value of the subject, comprising the steps of:
forming sharpness values from a sum of squared differences of image signal values of the subject in a line of neighboring pixels, and identifying an initial one of said sharpness values at a prescribed distance between the subject and the objective;
varying the prescribed distance by a first step width in both adjustment directions and calculating corresponding sharpness values;
identifying a starting distance corresponding to a best of the previous sharpness values as a starting value;
defining first and second distances in each adjustment direction, one of the distances having a relatively large second step width and the other distance having a relatively smaller third step width from said starting distance corresponding to the best sharpness value;
checking to see whether the first and second distances in each adjustment direction lie within a prescribed possible range of adjustment between the objective and subject and, if not, making said second and third step widths smaller;
identifying corresponding first and second sharpness values for the first and second distances in each adjustment direction;
defining respective straight lines that are tangent to a curve defined by the first and second sharpness values at each side of the best sharpness value;
identifying an intersection of the two tangents;
identifying a distance corresponding to said intersection as an adjustment value between the objective and the subject; and
adjusting the distance between the subject and the objective to said adjustment value.

19. An apparatus for setting sharpness of an optical imaging system by step-by-step adjustment of a distance between an image and an objective until a maximum is achieved for a respectively identified sharpness value of the image, comprising:
an optical imaging system having an objective;
an adjustment unit for the objective for setting a distance between the objective and an image;
an opto-electric scanner head for acquisition of image signal values by point-by-point and line-by-line scanning of the image;
a signal processing circuit connected to the scanner bead and to the adjustment unit;
means for forming sharpness values from a sum of squared differences of image signal values and a line of neighboring pixels;
means for identifying a first sharpness value with a prescribed distance between the image and the objective;
means for modifying the distance by a step having a first step width in both adjustment directions and for calculating corresponding sharpness values;
means for identifying a distance corresponding to a previous best sharpness value;
means for defining two distances in each adjustment direction with a second step width and with a third step width diminished in size in comparison to the second step width at a spacing from said distance corresponding to the best sharpness value;
means for carrying out a check to see whether all distances lie in a prescribed, possible range of adjustment of the objective relative to the image, and if not, the second and third step widths are reduced in size;
means for identifying the sharpness values for the defined or modified distances;
means for identifying a straight line that contains or intersects the sharpness values respectively lying at each side of the best sharpness value, said straight lines to be respectively viewed as tangents at a curve of the sharpness values over the distances within said range of adjustment;
means for identifying an intersection of the two tangents; and
a distance between objective and image associated with said intersection being identified as a desired adjustment value.

* * * * *